(12) United States Patent
De Buyl et al.

(10) Patent No.: US 6,300,453 B1
(45) Date of Patent: Oct. 9, 2001

(54) CURABLE POLYORGANOSILOXANE COMPOSITIONS

(75) Inventors: Francios De Buyl, Brussels; Jean-Paul Lecomte, Auderghem, both of (BE)

(73) Assignee: Dow Corning S.A., Seneffe (BE)

( * ) Notice: Subject to any disclaimer, the term of this patent is extended or adjusted under 35 U.S.C. 154(b) by 0 days.

(21) Appl. No.: 09/190,924

(22) Filed: Nov. 12, 1998

(30) Foreign Application Priority Data

Nov. 15, 1997 (GB) .................................................. 9724055

(51) Int. Cl.[7] .............................. C08G 77/06; C08G 77/08
(52) U.S. Cl. ............................. 528/18; 528/34; 524/431; 524/588; 524/847
(58) Field of Search ...................... 528/18, 34; 524/431, 524/588, 847

(56) References Cited

U.S. PATENT DOCUMENTS

| 3,175,993 | | 3/1965 | Weyenberg ........................ 260/46.5 |
| 4,772,675 | | 9/1988 | Klosowski et al. ..................... 528/15 |
| 4,962,174 | | 10/1990 | Bilgrien et al. ........................ 528/15 |
| 5,183,873 | * | 2/1993 | Viksne ................................... 528/16 |
| 5,260,372 | * | 11/1993 | Toporcer et al. ..................... 524/785 |
| 5,561,203 | * | 10/1996 | Strong et al. ......................... 525/477 |
| 5,905,123 | * | 5/1999 | Cifuentes et al. .................... 524/477 |

FOREIGN PATENT DOCUMENTS

| 0 693 533 A1 | 1/1996 | (EP) | ............... C08J/83/04 |
| 0 739 928 A2 | 10/1996 | (EP) | ............... C08J/3/03 |
| 747443 | 12/1996 | (EP) | ............... C08L/83/04 |
| 0 780 421 A2 | 6/1997 | (EP) | ............... C08J/3/03 |
| 0 803 540 A2 | 10/1997 | (EP) | ............... C08J/83/00 |
| 2550749 | 11/1996 | (JP) . | |

* cited by examiner

Primary Examiner—Robert Dawson
Assistant Examiner—Jeffrey B. Robertson
(74) Attorney, Agent, or Firm—Patricia M. Scaduto

(57) ABSTRACT

A composition capable of curing to form an elastomeric mass is disclosed which comprises a polymeric material having at least one hydroxyl or hydrolyzable group bonded to silicon, a crosslinking agent of the formula R—Si—$(OR^1)_3$ wherein R denotes an alkyl group having from 4 to 8 carbon atoms and each $R^1$ independently denotes an alkyl or acyl group having from 1 to 20 carbon atoms and a catalyst compound comprising a titanium compound. A method of using the composition as a sealing material is also disclosed.

16 Claims, No Drawings

CURABLE POLYORGANOSILOXANE COMPOSITIONS

This invention is concerned with curable polyorganosiloxane compositions and more particularly with polyorganosiloxane compositions which cure to form elastomeric masses. It also relates to a method of using said compositions as sealing materials.

Polyorganosiloxane compositions which cure to elastomeric masses are well known. Typically such compositions are obtained by mixing a polydiorganosiloxane having reactive terminal groups, for example, silanol groups, with a silane cross-linking agent, for example, an alkoxysilane, an acetoxysilane or an oximosilane, in the presence of a catalyst. These materials are curable upon exposure to atmospheric moisture at room temperature.

An important application of the above-described curable compositions is their use in sealant compositions. For use in sealants, a suitable composition should be capable of curing to a material which has a low modulus and a high elongation at break in a relatively short cure time. Other desirable attributes include the ability of the composition to cure to a clear, transparent or "water white" product which retains its translucency and lack of colour during use.

In an attempt to achieve the desired properties, one method described in the art comprises the use of curable compositions containing silanes in which chain extension occurs during the curing of the composition. To achieve chain extension, silanes containing only two functional groups are required for example, dialkoxysilanes and, in fact, numerous references describe compositions containing such silanes. Dialkoxysilanes, however, hydrolyse at a slower rate than trialkoxysilanes which are the preferred silanes.

Alkoxysilanes substituted with large hydrocarbon groups have been used in sealant compositions to achieve chain extension reactions and sealants with low modulus and high elongation at break. For instance, phenyltrimethoxysilane has been used in such curable compositions. The use of this alkoxysilane, however, has been shown to increase the cure time of curable compositions and additionally, the resultant cured product lacks the clarity desired for sealant applications.

We have now surprisingly found that if one employs an alkoxy- or acetoxy-silane having alkylpolyalkoxy or alkylpolyacetoxy groups and long chain alkyl groups in a curable composition, one may achieve cured materials of comparatively low modulus and comparatively higher elongation at break, without seriously impacting cure time. We have also found that seals formed from such curable compositions are more durable due to the reduced stress at the sealant-substrate interface. Additionally, certain curable formulations containing these type of silanes also retain the desired clarity after cure.

The present invention provides in one of its aspects a composition capable of curing to form an elastomeric mass, said composition comprising a polymeric material having at least one hydroxyl or hydrolyzable group bonded to silicon, a crosslinking agent and a compound capable of catalysing a reaction therebetween, characterised in that the crosslinking agent comprises a material of the formula R—Si—(OR$^1$)$_3$, wherein R denotes an alkyl group having from 4 to 8 carbon atoms and each R$^1$ independently denotes an alkyl or acyl group having from 1 to 20 carbon atoms and the catalyst compound comprises a titanium compound.

Also included within the scope of this invention are the elastomeric products obtained by curing said composition and a method of using said composition as a sealant.

The word "comprising" where used herein is used in its widest sense to mean and to encompass the notions of "include", "comprehend" and "consist of".

In a composition according to the invention, the crosslinking agent has the general formula R—Si—(OR$^1$)$_3$. In this formula, R denotes an alkyl group having from 4 to 8 carbon atoms and is linear, branched or cyclic. R may be, for example, a butyl group e.g. iso-butyl or t-butyl, a pentyl, hexyl, heptyl or octyl group. Preferably, R is a butyl or octyl group and most preferably an iso-butyl group. The length of the alkyl chain of the R group as found in the crosslinking agent is an important contributing factor to the improvement of elongation at break of a cured composition according to the invention. Each R$^1$ independently denotes an alkyl or acyl group having from 1 to 20 carbon atoms preferably an alkyl group having from 1 to 6 carbon atoms and most preferably a methyl or ethyl group. Mixtures of two or more of the crosslinking agents can also be used in a composition according to the invention.

Examples of preferred crosslinking agents include alkyltrialkoxysilanes and more preferably butyltrimethoxysilane, isobutyltrimethoxysilane, isobutyltriethoxysilane, octyltrimethoxysilane, and octyltriethoxysilane and most preferably isobutyltrimethoxysilane.

In a preferred embodiment of this invention, the crosslinking agent also comprises a material of the general formula R$^2$—Si—(OR$^1$)$_3$ in which R$^1$ is as described above and R$^2$ represents a hydrocarbon group other than R. For example, a preferred composition comprises a crosslinking agent comprising the above preferred alkyltrialkoxysilanes mixed with trialkoxysilanes in which R$^2$ represents a methyl, ethyl, propyl or vinyl group and preferably a methyl group. The mixtures of crosslinking agent and trialkoxysilane can be at any molar ratio desired such as, for example, from 1:10 to 10:1 but preferably the materials are mixed at a molar ratio of from 1:2 to 2:1 and more preferably at a molar ratio of about 1:1. In a more preferred embodiment of the invention, the crosslinking agent comprises a mixture of isobutyltrimethoxysilane and methyltrimethoxysilane at a molar ratio of about 1:1.

The crosslinking agent is employed in an amount sufficient to ensure adequate stability of the composition during storage whilst giving adequate rate of cure of the composition when exposed to atmospheric moisture. Generally, it is preferred that the crosslinking agent is used in the range of from about 0.1 to about 25 weight percent and more preferably from about 0.5 to about 10 weight percent, based on the weight of the polymeric material.

In a composition according to the invention, the polymeric material comprises any which has at least one hydroxyl or hydrolyzable group bonded to silicon. Generally, polymeric materials which are useful in a composition according to the invention have the general formula X-A-X. In this formula, A denotes an organic or siloxane molecular chain and preferably includes, for example, polyoxyalkylene chains or, more preferably, polyorganosiloxane chains.

Preferably the polyorganosiloxane chains include siloxane units of the formula R$^3{}_a$SiO$_{4-a/2}$ In this formula, each R$^3$ independently represents an alkyl group having from 1 to 10 carbon atoms, for example a methyl, ethyl or propyl group, an alkenyl group, for example a vinyl group, an aryl group, for example a phenyl group, or a fluorinated alkyl group and a has a value of 0, 1 or 2. Preferably the polymer materials are substantially linear, i.e. where a is equal to 2 for most units. The most preferred polyorganosiloxane chains are according to the general formula —(R$^3{}_2$SiO)$_t$— in which at least 80% of the $R^3$ units represent methyl groups and t has a value from about 200 to about 1500. Especially suitable materials have viscosities of about 500 mPa.s to about 200,000 mPa.s at 25° C.

In the above general formula of the polymeric material, at least one of the groups X contains at least one hydroxyl or hydrolyzable group bonded to silicon. Such groups X may be selected, for example, from —$R^3{}_2$SiOH e.g. —Si(CH$_3$)$_2$OH, —$R^3$Si (OR$^4$)$_2$, —Si(OR$^4$)$_3$, —$R^3{}_2$SiOR$^4$ or —$R^3{}_2$SiR$^5$SiR$^3{}_p$ (OR$^4$)$_{3-p}$ e.g. —Si(CH$_3$)$_2$C$_2$H$_4$Si (OC$_2$H$_5$)$_3$ wherein $R^3$ is as defined above and is preferably a methyl group, $R^4$ is an alkyl or oxyalkyl group in which the alkyl groups have up to 20 carbon atoms, preferably a methyl or ethyl group and more preferably an ethyl group, $R^5$ is a divalent hydrocarbon group which may be interrupted by one or more siloxane spacers having up to six silicon atoms and preferably two silicon atoms and p has the value 0, 1 or 2. The X groups which do not contain at least one hydroxyl or hydrolyzable group generally have the formula —SiR$^3{}_3$wherein $R^3$ is as defined above and is preferably a methyl group. Preferably the polymeric material has two X groups having a hydroxyl or hydrolysable group bonded to silicon per molecule.

These polymeric materials and methods for their production are well known in the art. They are described in a number of patent specifications, for example, U.S. Pat. No. 3,175,993, U.S. Pat. No. 4,772,675, U.S. Pat. No. 4,962,174 and JP 2,550,749.

Titanium compounds which are suitable as catalyst compounds for use in a composition according to the invention comprise those which catalyse the reaction between the crosslinking agent and the polymeric materials as described herein. Suitable compounds are known in the art and include, for example, alkyl titanate esters e.g. tetra t-butoxytitanate, tetraisopropoxytitanate, diisopropoxydiethylacetoacetatetitanate and titanium chelates. Examples of suitable titanium compounds can be found for example in EP 747443 which are deemed to be included in the scope of the invention. Preferably the titanium compound is an alkyl titanate ester or titanium chelate. The titanium compound is preferably used in the proportion from about 0.1 to about 25 weight % and more preferably 0.5 to about 10 weight % of the polymeric material and most preferably in a 1:2 weight ratio of catalyst to crosslinking agent. Where an additional alkoxysilane is present in the composition, it is preferred that the weight ratio of catalyst compound/crosslinking agent/ additional alkoxysilane is 1:1:1.

A composition according to the invention may contain as optional constituents other ingredients which are conventional to the formulation of silicone sealants and the like. For example, the composition may contain one or more finely divided, reinforcing or extending fillers. These include, for example, high surface area fumed and precipitated silicas, crushed quartz, diatomaceous earth, calcium carbonate, barium sulphate, iron oxide, titanium dioxide and carbon black preferably the filler is a finely divided filler and more preferably a finely divided silica. The proportion of such fillers employed will depend on the desired properties of the elastomer-forming curable composition and the cured elastomer. For most applications the filler content of the composition will be from about 5 to about 150 parts by weight per 100 parts by weight of the polymeric material having at least one hydroxyl or hydrolyzable group bonded to silicon.

Other ingredients which may be included in a composition according to the invention are co-catalysts for increasing the rate of cure of the composition, pigments, plasticisers, agents (usually organosilicon compounds) for treating fillers, rheological additives for improving toolability of the composition and adhesion improving substances such as y-aminopropyl triethoxysilane. Suitable co-catalysts are well known in the art and include the metal salts of carboxylic acids such as lead octoate and dibutyltin dilaurate, dibutyltin diacetate and stannous octoate.

Plasticisers are conventionally used to reduce the modulus of cured elastomers. Suitable materials include polydimethylsiloxanes having terminal triorganosiloxy groups wherein the organic substituents are e.g. methyl, vinyl or phenyl or combinations of these groups. Such polydimethylsiloxanes normally have a viscosity of from about 10 to about 100,000 mPa.s at 25° C. and can be employed in amounts up to about 80 parts per 100 parts by weight of the polymeric material.

A composition according to the invention can be prepared by mixing the ingredients in any order and employing any suitable mixing equipment. The order of addition and the choice of mixing equipment will impact the resulting cured product rheology. It is generally preferred to add the catalyst after mixing the polymeric material and the crosslinking agent. Any optional additional ingredients may be incorporated at any stage of the mixing operation but are preferably added after the catalyst addition. For non-slump sealants, it is preferred to mix the polymeric material, crosslinking agent and catalyst prior to adding any fillers present in the composition with any additional crosslinkers present subsequently added. For applications such as coatings, it is preferred that the polymeric material and any filler present in the composition are initially mixed together followed by mixing in the catalyst, the crosslinking agent and any optional ingredients. This method produces a composition with a low viscosity and modulus which renders it useful for applications such as coatings. After mixing, the composition may be stored under substantially anhydrous conditions, for example in sealed containers, until required for use. A composition according to the invention may be formulated as conventional one or two part systems.

A composition according to the invention may be employed in a variety of applications such as coating, caulking and encapsulating materials. The composition is, however, particularly suitable for sealing joints, cavities and other spaces in articles and structures which are subject to relative movement. Thus, a composition according to the invention is particularly suitable as a glazing sealant and for sealing building structures. Cured seals from a composition of this invention have sufficiently low modulus and sufficiently high elongation at break for most industry standards. In addition, due to the reduced stress at the sealant/substrate interface, the resulting joints formed by the composition are more durable when exposed to severe weathering conditions such as underwater immersion and/or outdoor exposure to sunlight.

The present invention also provides a method of forming an elastomeric mass which comprises applying a curable composition according to the invention on a substrate and then facilitating the cure of such composition.

In order that the invention may become more clear, there now follows non-limiting examples which are provided to illustrate the invention. In the examples, all parts are expressed by weight and all viscosities are at 25° C.

EXAMPLE 1

Sealant Compositions 1 to 4 were prepared by the following method: 70 parts of polymeric material (Polymer A), x parts of a crosslinker as indicated in Table I, 13 parts of 100 cSt polydimethylsiloxane, 1 part of silicone glycol fluid, 2 parts of tetra t-butoxy titanate and 9 parts of silica were mixed in a mixer at 25° C. in the absence of moisture.

Polymer A was a polydimethylsiloxane of the formula

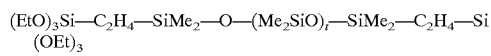
$(EtO)_3Si\text{—}C_2H_4\text{—}SiMe_2\text{—}O\text{—}(Me_2SiO)_t\text{—}SiMe_2\text{—}C_2H_4\text{—}Si(OEt)_3$ in which Et represents an ethyl group, Me represents a methyl group and t has a value such that the polymer has a viscosity of about 110,000 mPa.s.

Each of the compositions was extruded into a 310 ml cartridge from the mixer and stored therein for 7 days at 25° C. The composition from each cartridge was then used to provide cured samples from which various physical properties were determined according to the following standard test methods.

Skin-Over-Time (SOT) was determined as the period of time during which the surface of an applied bead of the composition could be tooled or worked. Skin-Over-Time was measured by spreading the material to form a layer approximately 0.2 cm thick on a clean smooth non-porous surface. The sample was exposed to a relative humidity of 50% RH at 25° C. At one minute intervals, the surface of the sample was lightly touched with a finger tip and the finger slowly drawn away. This was repeated every minute until the sample did not adhere to the finger tip. The time in minutes elapsed from the initial spreading of the material until the surface did not adhere to the finger tip was recorded as the Skin-Over-Time.

Tack-Free-Time (TFT) was determined as the period of time elapsed from extrusion of a bead of the composition until the surface was no longer tacky to the touch. Tack-Free-Time was measured by spreading a sample of the composition 2 mm thick on a clean smooth non-porous surface. The sample was exposed to a relative humidity of 50% RH at 22° C. At intervals of up to 5 minutes a clean polyethylene strip was laid on a fresh surface of the sample and gently pulled off. The time in minutes elapsed between spreading the sample and when the strip pulled away cleanly from the surface was recorded as the Tack-Free-Time.

Cure-In-Depth (CID) was determined as the thickness in mm of the composition when cured to an elastomeric state during ageing at ambient temperature and humidity for a specified period.

Colour was determined as follows: A sample of uncured composition was subjected to accelerated ageing in a cartridge at 70° C. for 1 week. The cured composition was then applied between two glass plates (using a device for colour measurement associated with a Macbeth® Color Eyes equipment) under testroom conditions of 23° C. and 50% relative humidity. The colour was measured by visual evaluation with the sample between the glass plates.

Modulus 100% (Mpa), Elongation at Break (%) and Tensile Strength (Mpa) were measured using a moulded and cured standard test slab 2 mm thick of each composition which had been cured by exposure to atmosphere at room temperature on a flat surface for at least 7 days. Tear strips were cut from the cured sample and stretched to breakpoint in a tensiometer and the various measurements recorded.

Hardness (Shore A) of each cured sample was measured using a durometer. The hardness reading was recorded within 2 seconds after the foot of the durometer was in firm contact with the sample.

The results of above measurements for the sealant compositions 1 to 4 are found in Table I.

From the results found in Table I, it can be seen that Composition 4 which employs a composition according to the present invention has higher elongation and lower modulus values than the comparative compositions (Compositions 1 to 3).

TABLE 1

| Composition | Cross-linker | x Parts | SOT min | TFT min | CID mm/24 h | Tensile Mpa | Elongation (%) | Modulus Mpa | Hardness Shore A | Colour cured |
|---|---|---|---|---|---|---|---|---|---|---|
| 1* | MTM | 5.00 | 6 | 14 | 2.77 | 1.61 | 357 | 0.48 | 15 | clear |
| 2* | VTE | 7.02 | 240 | 270 | 2.18 | 1.51 | 414 | 0.40 | 13 | clear |
| 3* | EPS | 4.98 | 6 | 160 | 2.54 | 0.21 | 57 | — | 6.5 | clear |
| 4 | OcTE | 10.15 | 360 | 360 | 1.57 | 1.71 | 647 | 0.32 | 10 | slightly opaque |

\* = comparative composition
MTM represents methyltrimethoxysilane
EPS represents ethylpolysilicate
VTE represents vinyltriethoxysilane
OcTE represents octyltriethoxysilane

EXAMPLE 2

Sealant Compositions 5 to 12 were prepared by mixing at 25° C. in the absence of moisture 70 parts of the polymeric material A, y parts of a crosslinker as indicated in Table II, 13 parts of 100 cSt polydimethylsiloxane, 1 part of silicone glycol fluid, 2.5 parts of tetra t-butoxy titanate and 9 parts of silica. The sealant compositions were extruded and analysed as indicated in Example 1. The results of the analysis are shown in Table II.

The results in Table II indicate that for the compositions according to the present invention (Compositions 6 to 10) there is a decrease of sealant modulus and an increase of elongation at break as the level of isobutyltrimethoxysilane in the compositions is increased.

EXAMPLE 3

Sealant compositions 13 to 15 were prepared by mixing at 25° C. in absence of moisture 66 parts of polymeric material B, z parts of an alkoxysilane as indicated in Table III, 13 parts of 100 cSt polydimethylsiloxane, 1 part of silicone glycol fluid, 2.2 parts of tetra t-butoxy titanate, 9 parts of silica, and 1.2 parts of an adhesion promoter comprising methyl trimethoxysilane, glycidoxypropyl trimethoxysilane and aminopropyl trimethoxysilane.

TABLE II

| Composition | Cross-linker | y Parts | SOT min | TFT min | CID mm/24 h | Tensile Mpa | Elongation (%) | Modulus Mpa | Hardness Shore A | Colour cured |
|---|---|---|---|---|---|---|---|---|---|---|
| 5* | MTM | 6.54 | 10 | 23 | 1.33 | 1.71 | 308 | 0.59 | 26 | clear |
| 6 | MTM/i-ButTM | 4.36/1.67 | 15 | 18 | 1.43 | 2.07 | 358 | 0.56 | 24 | clear |
| 7 | MTM/i-ButTM | 2.18/3.33 | 10 | 15 | 1.54 | 2.41 | 439 | 0.54 | 24 | clear |
| 8 | i-ButTM | 6.54 | 25 | 87 | 1.44 | 1.86 | 511 | 0.41 | 16 | clear |
| 9 | MTM/i-ButTM | 1.67/4.36 | 9 | 24 | 1.51 | 2.08 | 444 | 0.44 | 21 | clear |
| 10 | MTM/i-ButTM | 3.33/2.18 | 8 | 15 | 1.65 | 2.41 | 435 | 0.54 | 21 | clear |
| 11* | MTM | 5 | 7 | 15 | 1.85 | 2.20 | 391 | 0.56 | 22 | clear |
| 12* | MTM | 4 | 6 | 14 | 1.84 | 2.19 | 389 | 0.55 | 22 | clear |

\* = comparative
MTM = methyltrimethoxysilane
i-ButTM = isobutyltrimethoxysilane Polymer B was a mixture of polydimethylsiloxanes of the formula $$X-O-(Me_2SiO)_t-X$$

in which 80% of the X units comprise $$(EtO)_3Si-CH_4-SiMe_2-$$

and 20% of the X units comprise $$Me_3Si-$$

wherein Et represents an ethyl group, Me represents a methyl group and t has a value such that the polymer has a viscosity of about 110,000 mPa.s. The results are shown in Table III.

As can be seen from the results found in Table III, the compositions according to the present invention (Composition 14 and 15) which employ a mixture of crosslinking agents as found in a composition of the present invention with MTM have higher elongation and lower modulus values than the comparative composition using only MTM as the crosslinking agent (Composition 13).

TABLE III

| Composition | Cross-linker | z Parts | SOT min | TFT min | CID mm/24 h | Tensile Mpa | Elongation (%) | Modulus Mpa | Hardness Shore A | Colour cured |
|---|---|---|---|---|---|---|---|---|---|---|
| 13* | MTM | 4.4 | 7 | 35 | 1.63 | 1.03 | 337 | 0.37 | 14 | clear |
| 14 | MTM/i-ButTM | 1.3/3.4 | 8 | 31 | 1.5 | 0.99 | 350 | 0.33 | 14 | clear |
| 15 | MTM/i-ButTM | 2.3/2.5 | 10 | 29 | 1.66 | 1.05 | 376 | 0.34 | 13 | clear |

\* = comparative
MTM = methyltrimethoxysilane
i-ButTM = isobutyltrimethoxysilane That which is claimed is:

1. A composition capable of curing to form an elastomeric mass comprising a polymeric material having at least one substituent selected from the group consisting of a hydroxyl group bonded to a silicon atom and a hydrolyzable group bonded to a silicon atom;
   a crosslinking agent comprising a first material having a formula $R-Si-(OR^1)_3$ and a second material having a formula $R^2-Si(OR^1)_3$; and
   a titanium compound capable of catalyzing the reaction between the polymeric material and crosslinking agent;
   wherein R is an alkyl group having from 4 to 8 carbon atoms, each $R^1$ is independently selected from the group consisting of an alkyl group having from 1 to 20 carbon atoms and an acyl group having from 1 to 20 carbon atoms, and
   $R^2$ is a hydrocarbon group other than that described by R.

2. A composition according to claim 1 wherein the polymeric material has terminal groups selected from the group consisting of $-Si(CH_3)_3$, $-Si(CH_3)_2OH$ and $-Si(CH_3)_2C_2H_4Si(OC_2H_5)_3$.

3. A composition according to claim 1 wherein the titanium compound is selected from the group consisting of an alkyl titanate ester and a titanium chelate.

4. A composition according to claim 1 wherein the titanium compound is selected from the group consisting of tetra t-butoxytitanate, tetraisopropoxytitanate and diisopropoxydiethylacetoacetatetitanate.

5. A composition according to claim 1 wherein the first material of the crosslinking agent is selected from the group consisting of butyltrimethoxysilane, octyltrimethoxysilane, isobutyltrimethoxysilane, isobutyltriethoxysilane and octyltriethoxysilane.

6. A composition according to claim 1 wherein the first material of the crosslinking agent is isobutyltrimethoxysilane.

7. A composition according to claim 6 wherein the second material of the crosslinking agent is methyltrimethoxysilane.

8. A composition according to claim 7 wherein the isobutyltrimethoxysilane and methyltrimethoxysilane are present in a molar ratio of about 1:1.

9. A composition according to claim 1 and further comprising a finely divided filler.

10. A composition according to claim 1 wherein each $R^1$ is an alkyl group having 1 to 6 carbon atoms.

11. A composition according to claim 1 wherein $R^2$ of the second material of the crosslinking agent is selected from the group consisting of methyl, ethyl, propyl, and vinyl.

12. A composition according to claim 10 wherein $R^2$ of the second material of the crosslinking agent is selected from the group consisting of methyl, ethyl, propyl, and vinyl.

13. A composition according to claim 1 wherein the second material of the crosslinking agent is methyltrimethoxysilane.

14. A composition according to claim 1 wherein the first material having the formula $R\text{—}Si\text{—}(OR^1)_3$ and the second material having the formula $R^2\text{—}Si(OR^1)_3$; are present in a molar ratio of from 1:10 to 10:1.

15. A composition according to claim 1 wherein the first material having the formula $R\text{—}Si\text{—}(OR^1)_3$ and the second material having the formula $R^2\text{—}Si(OR^1)_3$; are present in a molar ratio of from 1:2 to 2:1; each $R^1$ is an independently selected alkyl group having 1 to 6 carbon atoms; and $R^2$ is selected from the group consisting of methyl, ethyl, propyl, and vinyl.

16. A method of forming an elastomeric mass which comprises applying a composition capable of curing to form an elastomeric mass on a substrate; and then facilitating the cure of the composition wherein the composition comprises a polymeric material having at least one substituent selected from the group consisting of a hydroxyl group bonded to silicon and a hydrolyzable group bonded to silicon;

a crosslinking agent comprising a first material having a formula $R\text{—}Si\text{—}(OR^1)_3$ and a second material having a formula $R^2\text{—}Si(OR^1)_3$; and a titanium compound capable of catalyzing a reaction between the polymeric material and crosslinking agent;

wherein R is an alkyl group having from 4 to 8 carbon atoms, each $R^1$ is independently selected from the group consisting of an alkyl group having from 1 to 20 carbon atoms and an acyl group having from 1 to 20 carbon atoms, and $R^2$ is a hydrocarbon group other than that described by R.

* * * * *